Sept. 13, 1960 E. F. YHAP 2,952,792

UNIVERSAL LOGIC BLOCK

Filed Sept. 11, 1959 4 Sheets-Sheet 1

| X | Y | Z | # |
|---|---|---|---|
| 0 | 0 | 0 | 0 |
| 0 | 0 | 1 | 1 |
| 0 | 1 | 0 | 2 |
| 0 | 1 | 1 | 3 |
| 1 | 0 | 0 | 4 |
| 1 | 0 | 1 | 5 |
| 1 | 1 | 0 | 6 |
| 1 | 1 | 1 | 7 |

INVENTOR
ERNESTO F. YHAP
BY Carl C. Kling
ATTORNEY

UNIVERSAL LOGIC BLOCK

Filed Sept. 11, 1959 4 Sheets-Sheet 3

United States Patent Office 2,952,792

Patented Sept. 13, 1960

2,952,792

UNIVERSAL LOGIC BLOCK

Ernesto F. Yhap, Poughkeepsie, N.Y., assignor to International Business Machines Corporation, New York, N.Y., a corporation of New York Filed Sept. 11, 1959, Ser. No. 839,401

6 Claims. (Cl. 313—108)

This invention relates to an electronic switching device, and more particularly to a device which may be interconnected with a multiplicity of like devices to form a complete switching system. The device, which forms a basic computer building block, may be termed a universal logic block.

A universal logic block must be capable of producing, on demand, an electrical representation of the presence of a desired one of a plurality of distinct conditions. For a three variable system there are 6 distinct inputs, X, Y, Z, not X, not Y, and not Z. The not function of any variable is generally shown by a horizontal bar over the letter or numeral designating the variable, for example, not X is $\bar{X}$. A three variable system permits 8 different simple combinations, which may be assigned numbers according to their binary values, as follows:

$\bar{X}\bar{Y}\bar{Z}$=#0 (Read: Not X and not Y and not Z is assigned number 0)

$\bar{X}\bar{Y}Z$=#1

$\bar{X}Y\bar{Z}$=#2

$\bar{X}YZ$=#3

$X\bar{Y}\bar{Z}$=#4

$X\bar{Y}Z$=#5

$XY\bar{Z}$=#6

$XYZ$=#7

In addition to the simple combinations, many complex combinations are available. Such combinations may be stated in algebraic form, using (+) to denote the alternative (or) function as follows:

$(X\bar{Y}+\bar{X}Y)Z=X\bar{Y}Z+\bar{X}YZ$=#5+#3

$XY=XYZ+XY\bar{Z}$+#7+#6

There are many other complex combinations possible with three variables.

For systems of four, five or more variables, binary values may be similarly assigned to each of the 16, 32 or more simple combinations, and complex combinations may similarly be set up.

Prior art universal logic blocks generally have been made up of plural OR circuits, AND circuits, and one or more powering devices such as tubes or transistors. Although effective electrically, such universal logic blocks have not become widely used because they cannot compete in price with specially designed circuit elements. Redundancies of components, such as diodes, and a necessity for lines to cross one another, cause such prior art universal logic blocks to be somewhat difficult to assemble and to package, which in turn makes them expensive. Printed circuit techniques become difficult because of the multiplicity of active elements such as diodes and transistors, and because of the crossovers of the interconnecting wires.

It is therefore an object of this invention to provide a low-cost universal logic block which is subject to manufacture using printed circuit techniques.

It is another object of this invention to provide a universal logic block in which there is no need for electrical conducting lines to cross over each other.

It is a further object of this invention to provide a universal logic block which is susceptible to use in systems having 2, 3, 4, or more variables.

It is a further object of the invention to provide a universal logic block which may be set to any of the functions of which it is capable according to a simple conversion table.

It is another object of the invention to provide a universal logic block which may be assigned differing functions at different periods in the machine cycle.

Another object of the invention is to provide a universal logic block which may be laid out on two sides of a printed circuit card.

The foregoing and other objects, features and advantages of the invention will be apparent from the following more particular description of preferred embodiments of the invention, as illustrated in the accompanying drawings.

In the drawings:

" Fig. 4 shows the operator side of the printed circuit card, with switch operators arranged to cooperate with switching elements arranged according to Fig. 3.

SUMMARY

The universal logic block comprises, for an n-variable system, $n+l$ groups of switching elements and sufficient switch operators to operate the switching elements. One group of switching elements is function-related; all others are variable-related. Variable inputs condition the related switch operations to render their related switching elements conductive; these variable inputs may correspond to output from other universal logic blocks in previous portions of a logical machine. Function inputs condition the related switch operators to render their related function switching elements conductive; the function inputs may also be machine controlled.

An electrical sample pulse is provided to a sample bus which connects to all $n+l$ groups of switching elements. An output bus also connects to all $n+l$ groups of switching elements. If the groups are designated . . . X, Y, Z, $(n+l)$, a $\bar{X}$ switching element and an X switching element switch in series between the sample and output busses forms the X group. In the next, or Y group, a $\bar{Y}$ switching element and a Y switching element in series shunt the $\bar{X}$ switching element; another $\bar{Y}$—Y series pair shunts the X switching element. In the Z group four $\bar{Z}$—Z series pairs connect the sample bus to the output bus, each pair shunting one of the Y or $\bar{Y}$ switching elements in the tier above; in turn, pairs of $\bar{Y}$—Y switching elements shunt the X or $\bar{X}$ switching elements in the group above.

In group $n+l$, $2^n/2$ series pairs connect the sample bus and output bus, each switching element shunting one of the $n$ or $\bar{n}$ switching elements in the group above. In a three-variable system, there are eight switching elements, which may be designated 7, 6, 5 . . . 0, and can be related to the function of the universal logic block by a conversion table. For example, switch #1, which is the conversion factor for $\bar{X}\bar{Y}Z$, completes a conductive path from sample bus to the output bus only if the related combination, $\bar{X}\bar{Y}Z$, is present.

Figures 1, 2:
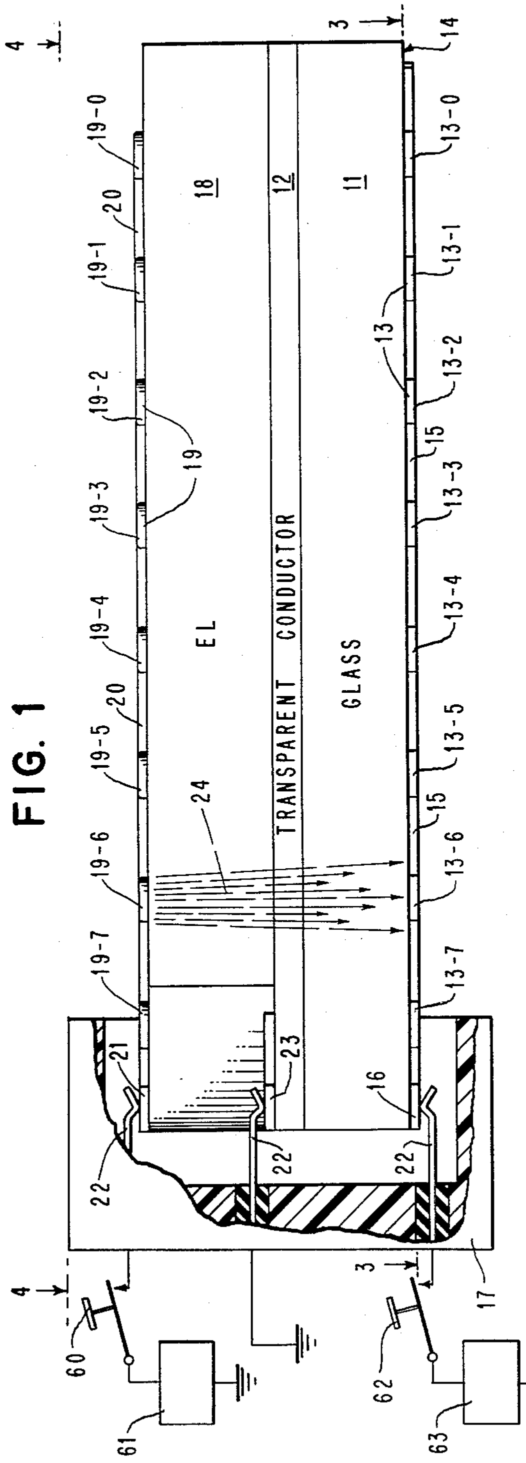
Fig. 1 is a cross section of a preferred opto-electronic embodiment of the invention, expanded in thickness to show various layers and connections.
Fig. 2 is a conversion table for a three variable system.

*Fig. 1—Cross-section*

Fig. 1 illustrates an expanded cross section of a preferred embodiment of the invention, utilizing the system of logic variously called opto-electronics, photologic, or ELPC (electroluminescence-photoconductivity) logic, in which switching elements are photoconductors (PC's) and switch operators are electroluminescent lamps (EL's) facing the related PC's.

Figure 3:
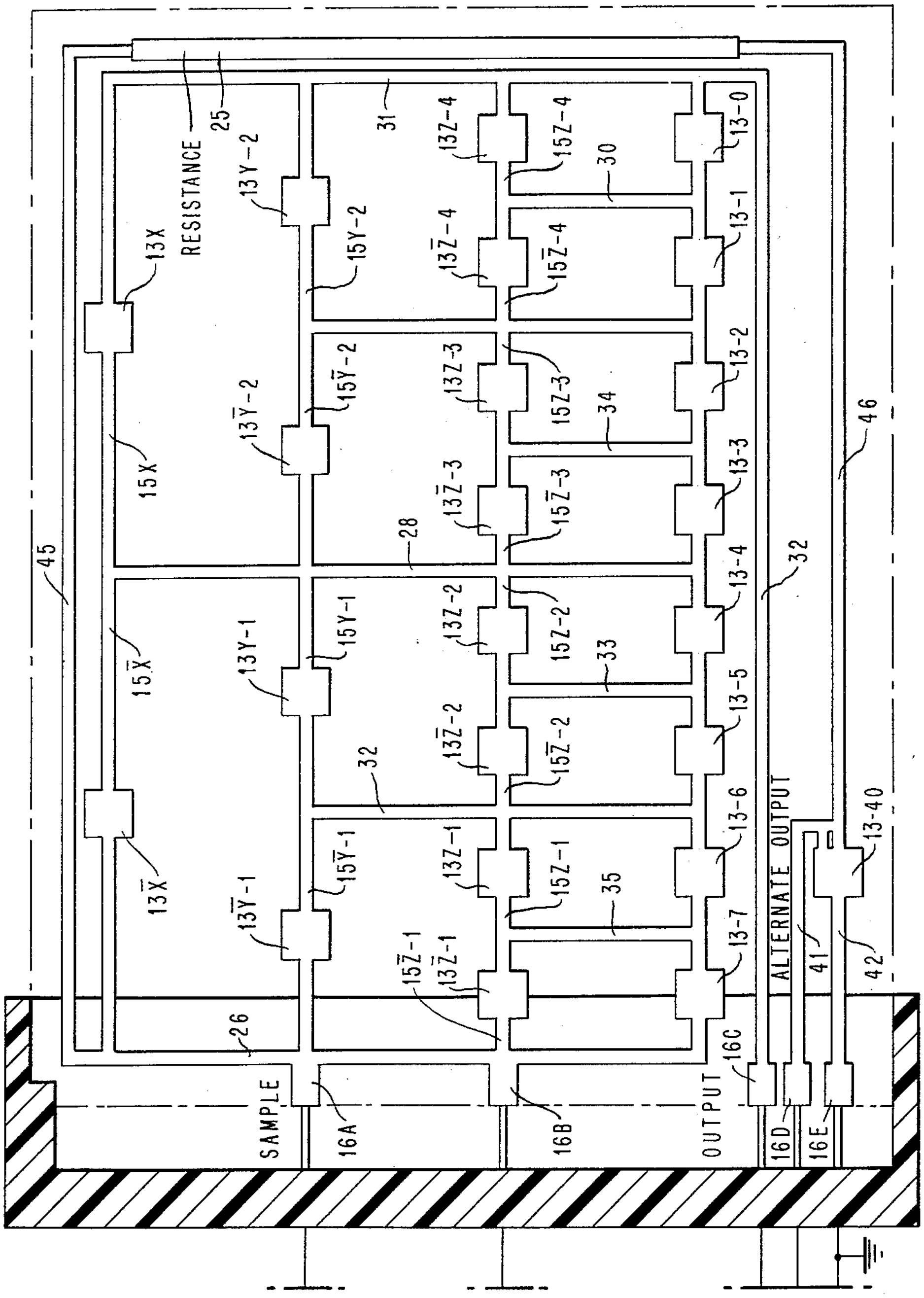
Fig. 3 is a preferred layout of conductors and switching elements on the switch side of a printed circuit card, viewed from above in Fig. 1 as indicated by arrows marked "Fig. 3."

The opto-electronic universal logic block is a plate of so-called conductive glass, which more particularly may be described as a glass plate 11 having a thin coating 12 of tin oxide or other conductive material on one face. Any array of PC's 13 are emplaced upon the insulative surface 14 of plate 11. The PC's may be applied by silk screen printing techniques and sintered by known methods. A network of conductors 15, interconnecting PC's 13 as will be more particularly explained in connection with Fig. 3, are printed over the PC's. A plurality of terminals 16 supply sample and output signal paths when the plate is plugged into a suitable socket 17, which in turn has plural terminals which are interconnected with other switching circuits in the logical machine.

An EL layer 18 of phosphor-loaded dielectric covers most of the conductive face 12 of plate 11. This layer may be sprayed or knife-coated upon the plate after the PC's 13 and conductors 15 have been completed, and then cured by baking. An array of conductive area electrodes 19, each facing a related PC 13, and connecting conductors 20 are printed over EL layer 18, making circuit connections to terminal 21, which supplies input paths to the various lamp areas when the plate is plugged into socket 17, which in turn has plural terminals 22 which are interconnected with other switching circuits in the logical machine.

Upon a portion of the conductive face 12 of plate 11 which is not covered by EL layer 18, a terminal 23 is placed. This terminal may be connected through the socket to ground potential of the logical machine. When suitable electrical potential is applied across an area such as 24 of EL layer 18 which lies between an electrode 19 and grounded conductive layer 12, area 24 luminesces, illuminating the associated PC 13, which conditions the PC for conduction.

*Fig. 2—Conversion table*

The eight simple combinations for a three-variable system are shown, each combination being assigned a number equal to its binary value for convenience in synthesizing circuits. Similar conversion tables for four, five or more variables may be simple expanded, and suitable numbers assigned. It will be shown in connection with Fig. 3 how the closing of a switch identified with the assigned number sets the universal logic block for an output when the related function of the variables is present.

*Fig. 3—Conductors*

For the three-variable system illustrated, there are four tiers of PC's in a lattice network. There are three variable-related tiers, one for each variable, and a function-related tier. Tier X has a complementary pair of PC's 13X and 13$\bar{X}$ functionally related to X and $\bar{X}$, in series between sample terminal 16A and output terminal 16C. Tier Y has two complementary pairs of PC's 13Y–1 and 13$\bar{Y}$–1; 13Y–2 and 13$\bar{Y}$–2 functionally related in each pair to Y and $\bar{Y}$, in series, pair 13Y–1 and 13$\bar{Y}$–2 shunting the PC 13X and the pair 13Y–2 and 13$\bar{Y}$–2 shunting the PC 13$\bar{X}$. Tier Z has four complementary pairs of PC's 13Z–1 and 13$\bar{Z}$–1; 13Z–2 and 13$\bar{Z}$–2; 13Z–3 and 13$\bar{Z}$–3; 13Z–4 and 13$\bar{Z}$–4 functionally related in each pair to Z and $\bar{Z}$, in series, each pair shunting one of the PC's in the Y tier. There is no conductive path possible through the three-tiered lattice with no PC's illuminated, since in any one of the many paths from sample terminal 16A to output terminal 16C there is a pair of complementary PC's, which by the rules are not coincidentally illuminated.

Function switch tier, 13—7 through 13—0, with all switches open, does not complete a conductive path from sample terminal 16A to output terminal 16C. With the current path thus open between sample and output terminals (the desired function not being present) the sample voltage is impressed across resistance 25 and appears at complement terminal 16D. When a function switch is closed and the related function is present, a conductive path is completed through the function switch to connect the sample input terminal to the output terminal.

SIMPLE FUNCTIONS

*Function #0 $\bar{X}\bar{Y}\bar{Z}$*

The universal logic block may be permanently set to function #0 by a conductive paste spread over PC 13—0, or temporarily set to function #0 by a light which illuminates PC 13–0. With the function set, the universal logic block is expected to provide an output if the $\bar{X}$ PC's, the $\bar{Y}$ PC's, and the $\bar{Z}$ PC's are concurrently illuminated during a sampling period, and to provide an alternate output if there is a discrepancy in the $\bar{X}\bar{Y}\bar{Z}$ appearance.

With $\bar{X}\bar{Y}\bar{Z}$ properly set in the switch operators, all $\bar{X}$, $\bar{Y}$, and $\bar{Z}$ switches are conductive. The sample pulse at input terminal 16A traverses input bus 26, progresses along tier conductor 15$\bar{X}$ through PC 13$\bar{X}$ to the long center bus 28, through PC 13$\bar{Y}$–2 to medium-length right center bus 29, through function switch PC 13—0 to output bus 31 to output terminal 16C.

*Function #5 $X\bar{Y}Z$*

With $X\bar{Y}Z$ properly set in the switch operators, the similarly marked switches are conductive. The sample pulse at input terminal 16A traverses input bus 26, progresses through PC 13$\bar{Y}$–1 to the medium-length left center bus 32, through function switch PC 13—5 to short bus 33, through PC 13Z–2 to the long center bus 28, through PC 13X to output bus 31.

The universal logic block operates similarly for other simple functions, the related function switch completing a conductive path through the variable switches when the setup of the variable switches matches that of the function switch.

*Complex functions*

$(X\bar{Y}+\bar{X}Y)Z$

When it is desired to synthesize, within a universal logic block, a complex function such as $(X\bar{Y}+\bar{X}X)Z$, which may be stated "X exclusive or Y and Z," it is necessary to reduce or expand the statement of the function into simple functions, as follows, to choose the proper function switches.

$$(X\bar{Y}+\bar{X}Y)Z=X\bar{Y}Z+\bar{X}YZ=\#5+\#3$$

The function switches are made conductive by a permanent or transitory switch operator as previously described. If the variable switches should be set to $X\bar{Y}Z$ at sample time, the similarly marked switches are conductive. The sample pulse at terminal 16A passes through 13$\bar{Y}$–1, medium-length bus 32, switch PC 13—5, short bus 33, through PC 13Z–2 to long center bus 28, through PC 13X to output bus 31.

If the variable switches are set to $\bar{X}YZ$, the sample pulse at terminal 16A passes along input bus 26, through 13$\bar{X}$ to long center bus 28, through switch PC 13—3 to short bus 34, through PC 13Z–3 to medium-length bus 29, and through 13Y–2 to the output bus 31.

If the variable switches are set to XYZ, the sample pulse at the input bus will be blocked, since switches $\bar{X}\bar{Y}\bar{Z}$, and 7 are open. If the variable switches are set to $\bar{X}\bar{Y}\bar{Z}$, the sample pulse will be blocked near the output bus, since switches X, Y, Z, and 0 are open. Alternate outputs are generated as will be more particularly described under subheading "Alternate Outputs."

*XY*

In the three-variable system, a two-variable function is a complex function. Since Z is irrelevant, the function may be stated $$XY(Z+\bar{Z})=XYZ+XY\bar{Z}=\#7+\#6$$

With XY properly set in the switch operators, the similarly marked variable switches are conductive as are function switches #7 and #6. The sample pulse at the input bus passes through switches #7 and #6, bypassing $\bar{Z}$–1 and Z–1 and short bus 35 regardless of their setting, onto medium-length bus 32, through 13Y–1 to center bus 28, and through 13X to output bus 31.

Figure 4:
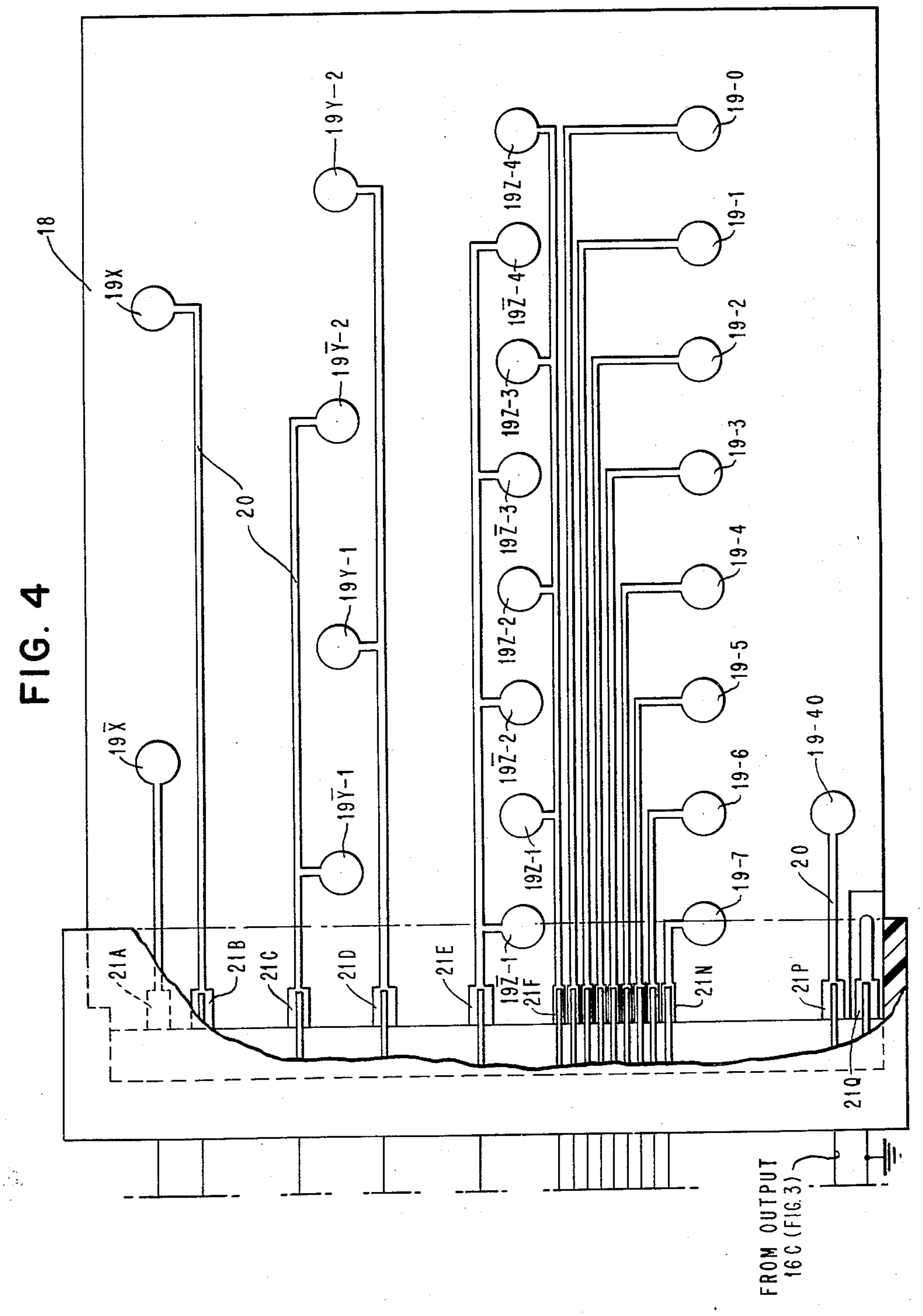
Fig. 4 is a preferred layout of conductors and switch operators viewed from above in Fig. 1 as indicated by arrows marked "Fig. 4.

*Fig. 4—Switch operators*

One side of each EL area, the conductive plate electrode 12 is connected through terminal 21Q to ground. To condition any EL switch operator 19, it is necessary only to apply a suitable potential to the related terminal 21A—21P and the associated conductor 20. For example, potential applied to terminal 21C causes both $\bar{Y}$ operator EL's to luminesce, potential applied to terminal 21N causes #7 operator EL to luminesce. The EL switch operators are light-coupled through conductive layer 11 and glass 12 to the related switch PC's (see Fig. 1).

*Figs. 3 and 4—Alternate output*

For true universal operations, it is desired to drive several universal logic blocks from the output of a preceding universal logic block. Each universal logic block, therefore, is provided with two outputs representing fulfillment of its function (output) and non-fulfillment (alternate output).

An inverter 40 is therefore included in the universal logic block. EL electrode 19—40 (Fig. 4) is connected through terminal 21P and the plug connector to output bus 31 and output terminal 16C (Fig. 3); the inverter EL luminesces during each output, illuminating PC 13—40 which in turn connects alternate output 16D to ground via conductor 41, PC 13—40, conductor 42, and grounded terminal 16E. Should the output bus 31 not be conditioned, the sample pulse is connected via conductor 45, resistance 25, and conductor 46 to PC 13—40 as a terminal and to the alternate output terminal 16D via conductor 41.

Should the output bus be conditioned, the inverter EL luminesces, illuminating PC 13—40. Although the sample pulse is connected via input bus 26, conductor 45, resistance 25, conductor 46, through illuminated PC 13—40, and conductor 41 to alternate output terminal 16D, PC 13—40, being illuminated, grounds alternate output terminal 16D via conductors 41 and 42. The sample voltage is impressed across resistance 25 in parallel to the output path. The impedance of the resistance 25 is chosen higher than that of $n+l$ illuminated PC's in series with the maximum load; the impedance of resistance 25 must however not be so high as to drop the potential at alternate output terminal 16D to a value too low to operate EL's.

Figure 7:
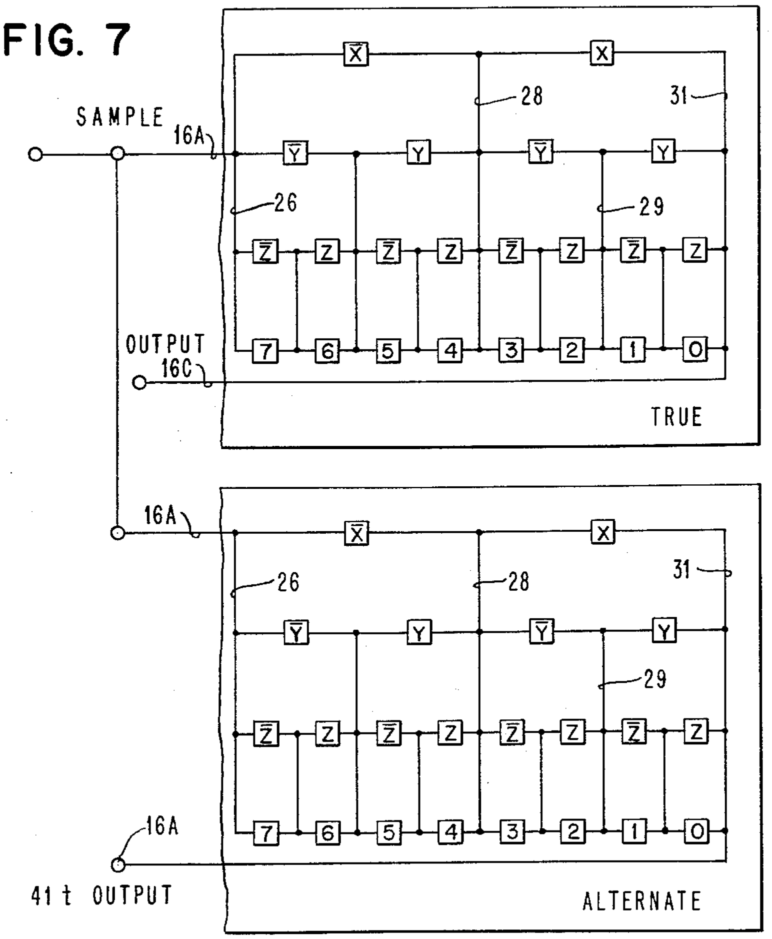
Fig. 7 is a diagram of switching elements for the superconductor embodiment.
Figure 5:
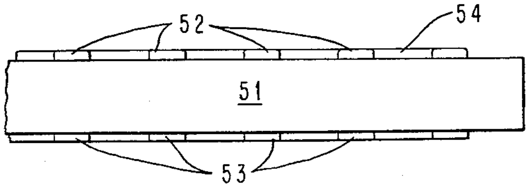
Fig. 5 is a partial cross-section of a preferred superconductor embodiment.
Figure 6:
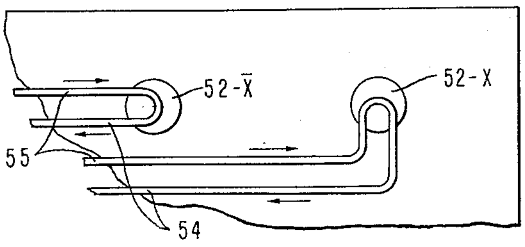
Fig. 6 is a partial layout of the switch operator side of the printed circuit card for the superconductor embodiment.

*Figs. 5–7—Other components*

The invention is not limited to ELPC logic, since there are other suitable components, of which superconductors of the thin film type are particularly applicable.

A current mode superconductor universal logic block may be printed on two sides of a glass plate 51 in the manner illustrated in Fig. 5. The switch operator 52 is a field-producing area; the switching element 53 is the superconductor. A return path 54 as well as a signal path 55 for each switch operator 52 must be incorporated.

To preserve the constant current condition under which superconductors operate most advantageously, the inverter of the photologic embodiments is omitted in favor of complementary duplication, with two complete blocks, (Fig. 7) a true block and an alternate block, each having *n* tiers of variable switching elements and function switches. In one set the function switching elements are designated 7—0; in the other they are designated in opposite sense as $\bar{7}$—$\bar{0}$.

The sample pulse at 16A, if the variables are set up corresponding to the function setup of the true set, finds a superconductive path to output terminal 16C. There is a resistive path between input and output terminals of the alternate set. Conversely, if there is discrepancy between the variables and the function setup, there is no superconductive path between sample input and true output; there is, however, a superconductive path between sample input and alternate output. A convenient wiring arrangement is to apply the sample pulse to terminal 16A of the true block, and to connect terminal 16B of the true block to terminal 16A of the alternate block.

For example, where the $\bar{X}Y\bar{Z}$(2) function is desired, switch operator 2 sets up the true block; in the alternate block, all function switching elements except the $\bar{2}$($\bar{7}$, $\bar{6}$, $\bar{5}$, $\bar{4}$, $\bar{3}$, $\bar{1}$, and $\bar{0}$) are made conductive by the related switch operators. The $\bar{X}Y\bar{Z}$ setup of the variables completes a superconductive path in the true block via terminal 16A, $\bar{X}$, center bus 28, $\bar{Z}$, switching element 2, bus 29 and Y to output bus 31 and terminal 16C. The superconductive path through the alternate block is open at function switching elements $\bar{2}$, Z, $\bar{Y}$ and X. Should the variable setting be $XY\bar{Z}$, the true block would be open at function switching element 6, Z, $\bar{Y}$, $\bar{X}$, the alternate block superconductive via terminal 16A, input bus 26, function switching elements $\bar{7}$, $\bar{6}$, $\bar{5}$, $\bar{4}$, center bus 28 and variable switching element X to output bus 31 and terminal 16C.

While the invention has been particularly shown and described with reference to preferred embodiments thereof, it will be understood by those skilled in the art that various changes in form and details may be made therein without departing from the spirit and scope of the invention.

What is claimed is:

1. A universal logic block to signal the occurrence of a selected one of $2^n$ possible functions of *n* variables comprising, in combination: structural means; a sample terminal; an output terminal; and a network including *n* groups of paired complementary variable switching elements, the groups being assigned to the respective variables and interconnected in pyramidal lattice fashion so that each variable switching element is shunted by paired complementary switching elements of the next variable, group *n* having $2^n$ switching elements in series relationship with each other and in series-parallel relationship with the remaining switching elements in said network; and $2^n$ function switching elements, each shunting one of the said $2^n$ switching elements in group *n*, whereby the operation of a selected function switching element and the operation of variable switching elements assigned to the selected function completes a conductive electrical path between said sample terminal and said output terminal.

2. A universal logic block as described in claim 1, wherein said structural means is a plate, said network of switching elements are arrayed on one side of said plate, and related switch operators are arrayed on the other side of said plate, coupled through said plate to operate said switching elements.

3. A universal logic block as described in claim 2 in which said switching elements are photo-conductors, said switch operators are electroluminescent lamps, and said plate has a transparent conductive side which forms an integral part of the electroluminescent lamps.

4. A universal logic block as described in claim 1, comprising in addition alternate-output means including an alternate-output terminal, resistance means normally connecting said sample terminal to said alternate-output terminal, and means operable in response to an output signal through one or more of said function switching elements to inhibit alternate-output signals.

5. A universal logic block as described in claim 4, in which said switching elements are photoconductors, said switch operators are electroluminescent lamps, and said means operable in response to an output signal is an electroluminescent lamp switch operator, arranged to luminesce under an output signal, and the means to inhibit alternate-output signals is a photoconductor arranged to connect ground potential to said alternate-output terminal.

6. A universal logic block as described in claim 2, in which said switch elements are superconductors, and said switch operators are superconductor field-producing elements.

References Cited in the file of this patent

Mellon Institute of Industrial Research, Quarterly Report No. 3, Second Series of the Computer Components Fellowship No. 347, April 1, 1954 to June 30, 1954, August 2, 1954.

Proceedings of the I.R.E. December, 1955; pages 1897 to 1906.

Journal British I.R.E., March, 1957; pages 141 to 154.